United States Patent
Sharoni

(10) Patent No.: US 9,026,918 B2
(45) Date of Patent: May 5, 2015

(54) ENABLING A USER DEVICE TO ACCESS ENTERPRISE DATA

(75) Inventor: Dan Sharoni, Mountain View, CA (US)

(73) Assignee: Accenture Global Services Limited, Dublin (IE)

( * ) Notice: Subject to any disclaimer, the term of this patent is extended or adjusted under 35 U.S.C. 154(b) by 368 days.

(21) Appl. No.: 12/436,341

(22) Filed: May 6, 2009

(65) Prior Publication Data

US 2010/0100825 A1 Apr. 22, 2010

Related U.S. Application Data

(60) Provisional application No. 61/106,142, filed on Oct. 16, 2008.

(51) Int. Cl.
*G06F 3/048* (2013.01)
*H04L 29/08* (2006.01)
*G06F 9/54* (2006.01)

(52) U.S. Cl.
CPC ............ *H04L 67/2823* (2013.01); *G06F 9/547* (2013.01); *G06F 2209/541* (2013.01)

(58) Field of Classification Search
USPC .......................................... 715/714; 709/218
See application file for complete search history.

(56) References Cited

U.S. PATENT DOCUMENTS

| | | | |
|---|---|---|---|
| 5,845,299 A | 12/1998 | Arora et al. | |
| 5,909,545 A | 6/1999 | Frese, II et al. | |
| 5,984,299 A | 11/1999 | Hirota et al. | |
| 6,011,637 A | 1/2000 | Pfeiffer | |
| 6,266,098 B1 * | 7/2001 | Cove et al. | 348/563 |
| 6,477,550 B1 | 11/2002 | Balasubramaniam et al. | |
| 6,574,635 B2 | 6/2003 | Stauber | |
| 6,725,238 B1 | 4/2004 | Auvenshine | |
| 6,738,975 B1 * | 5/2004 | Yee et al. | 719/310 |
| 6,784,900 B1 | 8/2004 | Dobronsky et al. | |
| 6,801,244 B2 | 10/2004 | Takeda et al. | |

(Continued)

FOREIGN PATENT DOCUMENTS

| | | |
|---|---|---|
| EP | 1126681 A2 | 1/2001 |
| EP | 1126681 | 8/2001 |
| EP | 1172726 A2 | 9/2001 |

OTHER PUBLICATIONS

Application and Figures as Filed Sep. 11, 2009.

(Continued)

*Primary Examiner* — Matt Kim
*Assistant Examiner* — William Trapanese
(74) *Attorney, Agent, or Firm* — Fish & Richardson P.C.

(57) ABSTRACT

A method, system and graphical user interface for enabling a user to access enterprise data and interact with enterprise applications generating the enterprise data using a portable electronic device is disclosed. A native application for a portable electronic device enables a user of the portable electronic device to initiate or interact with one or more enterprise applications. Each of the enterprise applications is executed remotely on a system in communication with the portable electronic device, where the portable electronic device may communicate data to the remote system and display data received from the remote system. Processing resources and storage resources of the remote system may be utilized to execute the enterprise application, thereby enabling a user to initiate or interact with a computationally-intensive enterprise application using a portable electronic device.

18 Claims, 10 Drawing Sheets

(56) References Cited

U.S. PATENT DOCUMENTS

| | | |
|---|---|---|
| 6,957,390 B2 | 10/2005 | Tamir et al. |
| 7,159,192 B2 | 1/2007 | Dobronsky |
| 7,412,655 B2 | 8/2008 | Wada et al. |
| 7,546,571 B2 | 6/2009 | Mankin et al. |
| 7,895,336 B2 | 2/2011 | Cameron et al. |
| 2001/0051907 A1 | 12/2001 | Kumar et al. |
| 2002/0063735 A1 | 5/2002 | Tamir et al. |
| 2002/0116453 A1 | 8/2002 | Todorov et al. |
| 2002/0140729 A1 | 10/2002 | Price et al. |
| 2002/0157023 A1 | 10/2002 | Callahan et al. |
| 2003/0070005 A1 | 4/2003 | Mukundan et al. |
| 2003/0163784 A1 | 8/2003 | Daniel et al. |
| 2004/0100490 A1 | 5/2004 | Boston et al. |
| 2004/0109013 A1 | 6/2004 | Goertz |
| 2005/0075115 A1 | 4/2005 | Corneille et al. |
| 2005/0114798 A1 | 5/2005 | Jiang et al. |
| 2005/0198158 A1 | 9/2005 | Fabre |
| 2005/0213763 A1* | 9/2005 | Owen et al. .................... 380/270 |
| 2005/0223109 A1 | 10/2005 | Mamou |
| 2006/0005207 A1 | 1/2006 | Louch et al. |
| 2006/0031494 A1* | 2/2006 | Marcus et al. ................ 709/225 |
| 2006/0075112 A1* | 4/2006 | Polozoff ....................... 709/227 |
| 2006/0107217 A1 | 5/2006 | Lu et al. |
| 2006/0250578 A1 | 11/2006 | Pohl et al. |
| 2007/0033262 A1 | 2/2007 | Labelle et al. |
| 2007/0038934 A1 | 2/2007 | Fellman |
| 2007/0101297 A1 | 5/2007 | Forstall et al. |
| 2007/0207777 A1* | 9/2007 | Owen et al. .................... 455/411 |
| 2007/0255715 A1 | 11/2007 | Li et al. |
| 2007/0282858 A1* | 12/2007 | Arner et al. .................... 707/10 |
| 2008/0082934 A1 | 4/2008 | Kocienda et al. |
| 2008/0195954 A1 | 8/2008 | Dharmarajan et al. |
| 2008/0297485 A1* | 12/2008 | Park ............................. 345/173 |
| 2009/0055749 A1 | 2/2009 | Chatterjee et al. |
| 2010/0153866 A1 | 6/2010 | Sharoni |

OTHER PUBLICATIONS

Advisory Action Mail Date Feb. 25, 2013.
Australian Office Action in Application No. 2012258448, issued Sep. 22, 2014, 2 pages.
Collins English Dictionary, 2003, "application program", http://www.thefreedictionary.com/application+program, pp. 1-2.
European Office Action in Application No. 09252423.0-1870, issued Nov. 24, 2014, 2014, 4 pages.
Australian Patent Examination Report No. 1 for Application No. 2014233648 dated Oct. 24, 2014, 4 pages.

* cited by examiner

ENABLING A USER DEVICE TO ACCESS ENTERPRISE DATA

RELATED APPLICATIONS

The present application claims the benefit of U.S. Provisional Patent Application No. 61/106,142, filed Oct. 16, 2008, entitled "NATIVE APPLICATION FOR A PORTABLE ELECTRONIC DEVICE ENABLING USER INTERACTION WITH ENTERPRISE APPLICATIONS," naming Dan Sharoni as the inventor. That application is incorporated herein by reference in its entirety and for all purposes.

BACKGROUND OF THE INVENTION

Information related to a business, its customers, its competitors, and the like, is commonly referred to as "enterprise data" and can be used by the business for a variety of purposes. For example, enterprise resource planning (ERP) utilizes enterprise data to implement business functions such as manufacturing, supply chain management, financials, projects, human resources and customer relationship management (CRM). Enterprise data may also be used for product lifecycle management (PLM) to help manufacturers with product-related information. As a further example, enterprise data may be used for supply chain management (SCM) and supplier relationship management (SRM) functions.

Conventional software packages for providing access to enterprise data generally require significant storage and processing resources, and thus, are generally run on desktop computer systems, server computer systems, or the like. The computer system running the conventional software package may generate a query for specific enterprise data and send the query to a system able to access the enterprise data. Once data is received from the system, it may be processed by the computer system running the conventional software package and presented to the user of the computer system.

Although enterprise data may be accessed using conventional software packages, the ability to access the enterprise data from remote locations or on the go is limited since the computer systems able to run the conventional software packages cannot be easily transported. Additionally, conventional software packages generally cannot be run on portable electronic devices such as smartphones or personal digital assistants (PDAs). Further, conventional portable electronic devices typically lack the storage and processing resources to adequately store and process the enterprise data. Thus, access to enterprise data is limited using conventional solutions.

Some portable devices allow limited access to resident enterprise applications that run on the portable device. However, these portable devices limit communication between multiple enterprise applications. Unfortunately, enterprise solutions often require multiple enterprise applications to talk to one another to obtain information, etc. As such, portable devices that restrict or prevent communication between enterprise applications offer a poor platform choice for enterprise applications.

SUMMARY OF THE INVENTION

Accordingly, a need exists for increased access to enterprise data on portable computer systems. More specifically, a need exists to access enterprise data from remote locations and while on the move. A need also exists for a portable electronic device capable of providing access to enterprise data and enabling a user to interact with enterprise applications capable of processing the enterprise data. Additionally, a need exists for enabling multiple enterprise applications, accessed by a portable electronic device which restricts data sharing between multiple resident or native applications, to share data. Embodiments of the present invention provide novel solutions to these needs and others as described below.

Embodiments of the present invention are directed to a method, system and graphical user interface for enabling a user to access enterprise data and interact with enterprise applications generating the enterprise data using a portable electronic device. More specifically, a native application for a portable electronic device enables a user of the portable electronic device to initiate or interact with one or more enterprise applications. The enterprise applications may be executed simultaneously and exchange data with one another. Each of the enterprise applications is executed remotely on a system in communication with the portable electronic device, where the portable electronic device may communicate data to the remote system and display data received from the remote system. For example, user inputs related to the enterprise applications may be communicated to the remote system from the portable electronic device, while enterprise web content associated with execution of the enterprise application may be communicated to the portable electronic device for display thereon. In this manner, embodiments utilize processing resources and storage resources of the remote system to execute the enterprise application, thereby enabling a user to initiate or interact with a computationally-intensive enterprise application using a portable electronic device.

Additionally, embodiments of the present invention offer a mechanism for enabling multiple enterprise applications, accessed by a portable electronic device which restricts data sharing between multiple native applications, to share data. The enterprise applications may be executed on a remote system, and therefore, not be subject to the data sharing restrictions associated with multiple native applications of the portable electronic device. Additionally, the data accessed by and/or shared between the multiple enterprise applications may be stored on a memory of the portable electronic device, a memory of the remote system executing the enterprise applications, on a memory of another system (e.g., communicatively coupled to the portable electronic device and/or the remote system executing the enterprise applications), etc.

In one embodiment, a method of interfacing with a user includes executing a native application on a portable computer system, wherein the portable computer system comprises a display screen and a user input device. The method also includes, using the native application, displaying of plurality of applications for selection by a user. In response to a user selection of a first of the plurality of applications, the portable computer system causes the first application to be executed on a remote computer system, wherein execution of the first application generates first enterprise content at the remote computer system. The native application receives the first enterprise content and parses the first enterprise content for display thereof. The method also includes the native application rendering a representation of the first enterprise content on the display screen. The native application may also provide content to the enterprise applications.

In another embodiment, a system includes a first component operable to execute a plurality of enterprise applications. A portable electronic device is communicatively coupled to the first component and disposed remotely from the first component, wherein the portable electronic device is operable to execute a plurality of native applications, wherein the plurality of native applications comprises a native enterprise application operable to initiate execution of at least one enterprise application of the plurality of enterprise applications on the first component. The enterprise applications may share data with one another, where the shared data may be stored in a memory of the portable electronic device, a memory of the system, etc. The system also includes a second component communicatively coupled between the first component and the portable electronic device, wherein the second component is operable to transform enterprise content from the at least one enterprise application into enterprise web content for rendering on the portable electronic device. The portable electronic device is further operable to display the enterprise web content for enabling user interaction with the at least one enterprise application executed by the first component.

In yet another embodiment, a graphical user interface for a portable electronic device includes a first region for displaying a first plurality of user interface elements associated with a native enterprise application executed by the portable electronic device, wherein each of the first plurality of user interface elements is associated with a respective enterprise application (e.g., executed on a system disposed remotely from the portable electronic device), wherein selection of a first user interface element of the first plurality of user interface elements is operable to cause a remote computer system to execute a first enterprise application associated with the first user interface element, and wherein the first region is further operable to display enterprise content generated by the remote computer system executing the first enterprise application. The graphical user interface also includes a second region for displaying a second plurality of user interface elements (e.g., a "home" button or recalling a home screen, a "back" button for recalling previously-displayed data or content, etc.) associated with the native enterprise application and at least one other native application for execution by the portable electronic device, wherein a user interaction with a second user interface element of the second plurality of user interface elements is operable to adjust a display of the enterprise web content in the first region.

The graphical user interface may provide uniform presentation of the results of the enterprise application execution. For example, the graphical user interface may display the data associated with the execution of the enterprise applications (e.g., enterprise data, enterprise content, enterprise web content, etc.) with a similar "look and feel" (e.g., with similar buttons, text, icons, etc.) as other native applications executed by the portable electronic device.

The graphical user interface may allow selection of multiple enterprise applications by displaying a plurality of enterprise applications in a selection screen. The selection screen may be reader-based, e.g., the selection screen may be generated using data from a remote system (e.g., executing the enterprise applications and disposed remotely from the portable electronic device) which is parsed and displayed by the native enterprise application executing on the portable electronic device.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
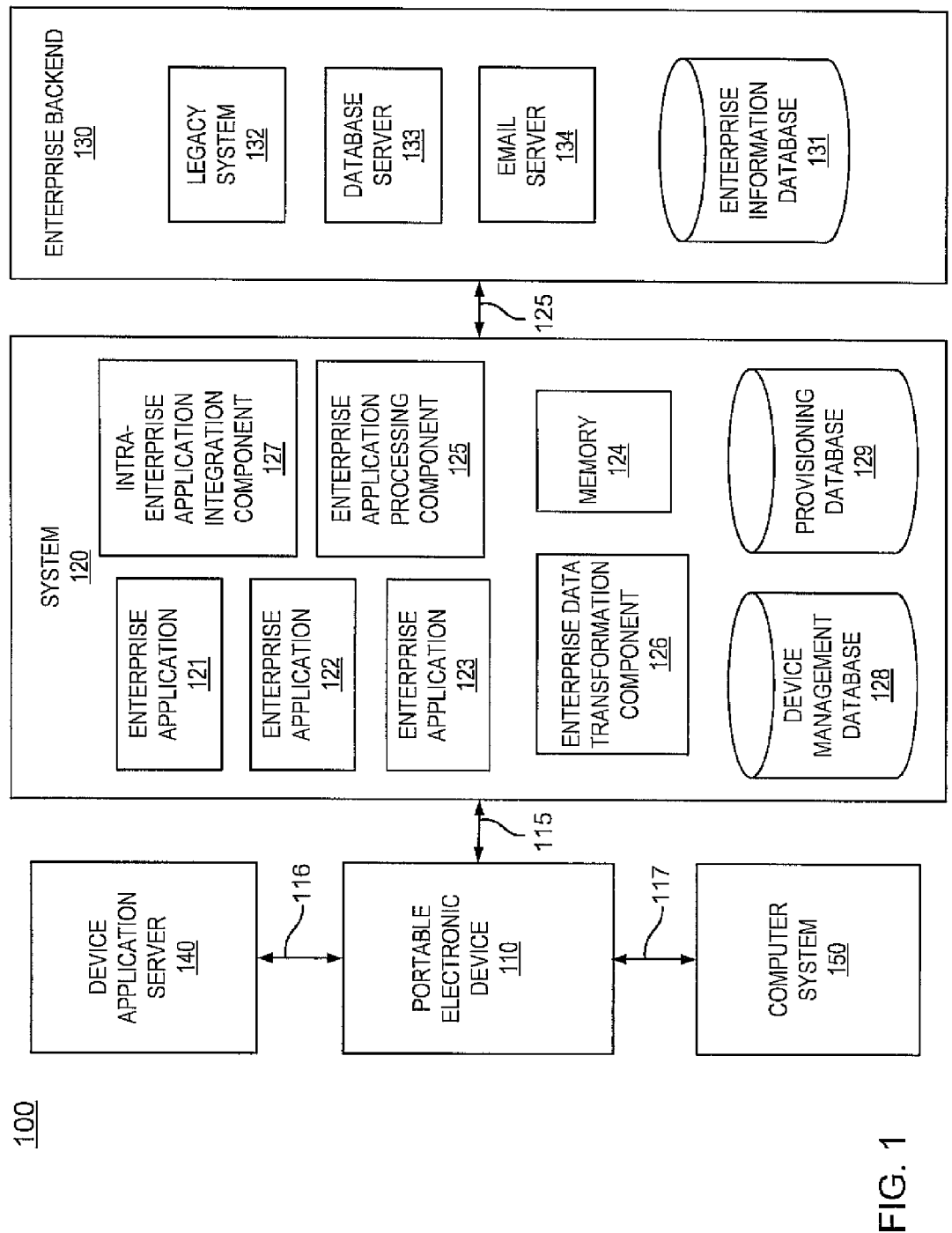
FIG. 1 shows an exemplary system for providing access to enterprise data on a portable electronic device in accordance with one embodiment of the present invention.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some regions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "aborting," "accepting," "accessing," "adding," "adjusting," "analyzing," "applying," "assembling," "assigning," "balancing," "blocking," "calculating," "capturing," "combining," "comparing," "collecting," "configuring," "creating," "debugging," "defining," "delivering," "depicting," "detecting," "determining," "displaying," "establishing," "executing," "forwarding," "flipping," "generating," "grouping," "hiding," "identifying," "initiating," "instantiating," "interacting," "modifying," "monitoring," "moving," "outputting," "parsing," "performing," "placing," "presenting," "processing," "programming," "querying," "removing," "rendering," "repeating," "resuming," "sampling," "simulating," "sorting," "storing," "subtracting," "suspending," "tracking," "transcoding," "transforming," "unblocking," "using," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

EMBODIMENTS OF THE INVENTION

Embodiments of the present invention enable a user to access enterprise data and interact with enterprise applications generating the enterprise data using a portable electronic device. More specifically, a native application (e.g., native enterprise application 211 of FIG. 2) for a portable electronic device (e.g., 110 of FIG. 1) enables a user of the portable electronic device to interact with one or more enterprise applications (e.g., enterprise applications 121-123 of FIG. 1). Each of the enterprise applications is executed remotely on a system (e.g., 120) in communication with the portable electronic device, where the portable electronic device may communicate data to the remote system (e.g., via interface 115) and display data received from the remote system (e.g., via interface 115). For example, user inputs (e.g., input using user interface component 220 of FIG. 2) related to the enterprise applications may be communicated to the remote system from the portable electronic device, while enterprise web content associated with initiation or execution of the enterprise application may be communicated to the portable electronic device for display thereon (e.g., using display device 230 of FIG. 2). In this manner, embodiments utilize processing resources and storage resources of the remote system (e.g., 120) to execute the enterprise application (e.g., 121, 122, 123, etc.), thereby enabling a user to initiate or interact with a computationally-intensive enterprise application (e.g., 121, 122, 123, etc.) using a portable electronic device (e.g., 110).

Figure 3:
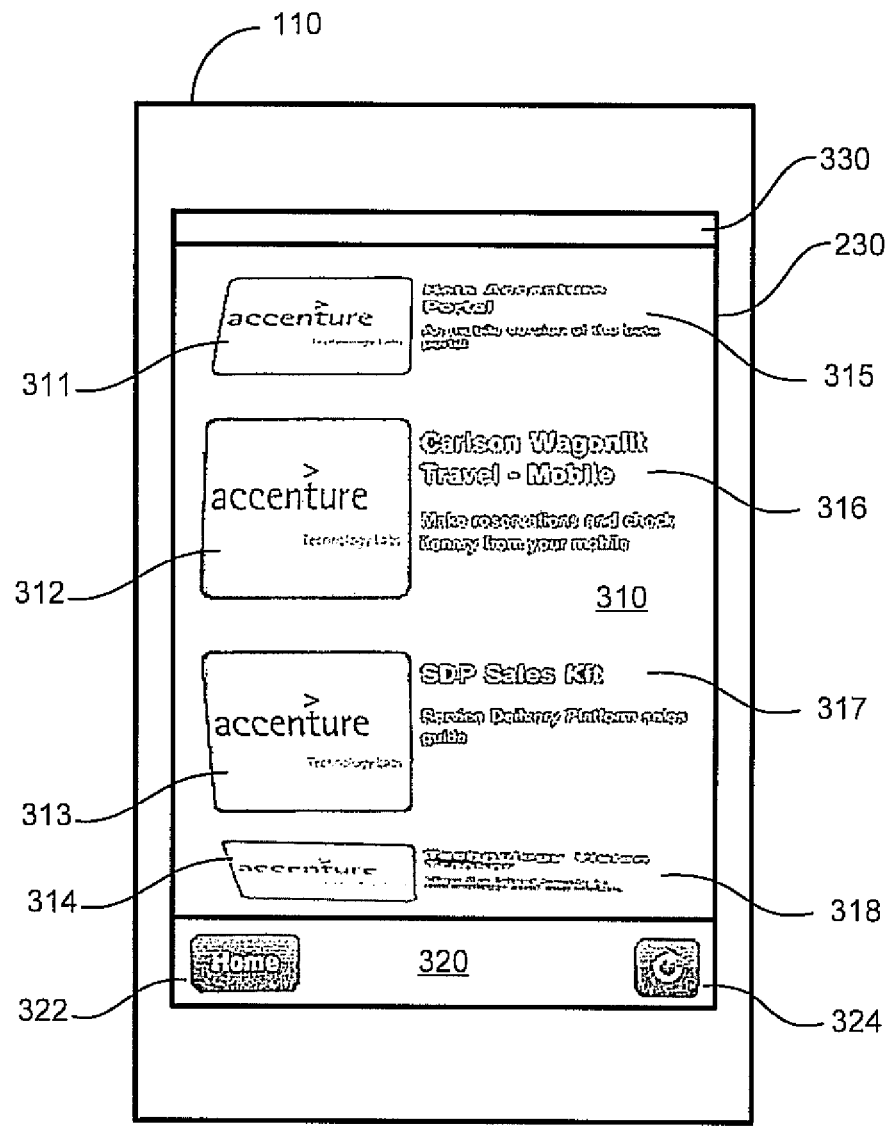
FIG. 3 shows a first exemplary graphical user interface of an exemplary display device in accordance with one embodiment of the present invention.
Figure 4:
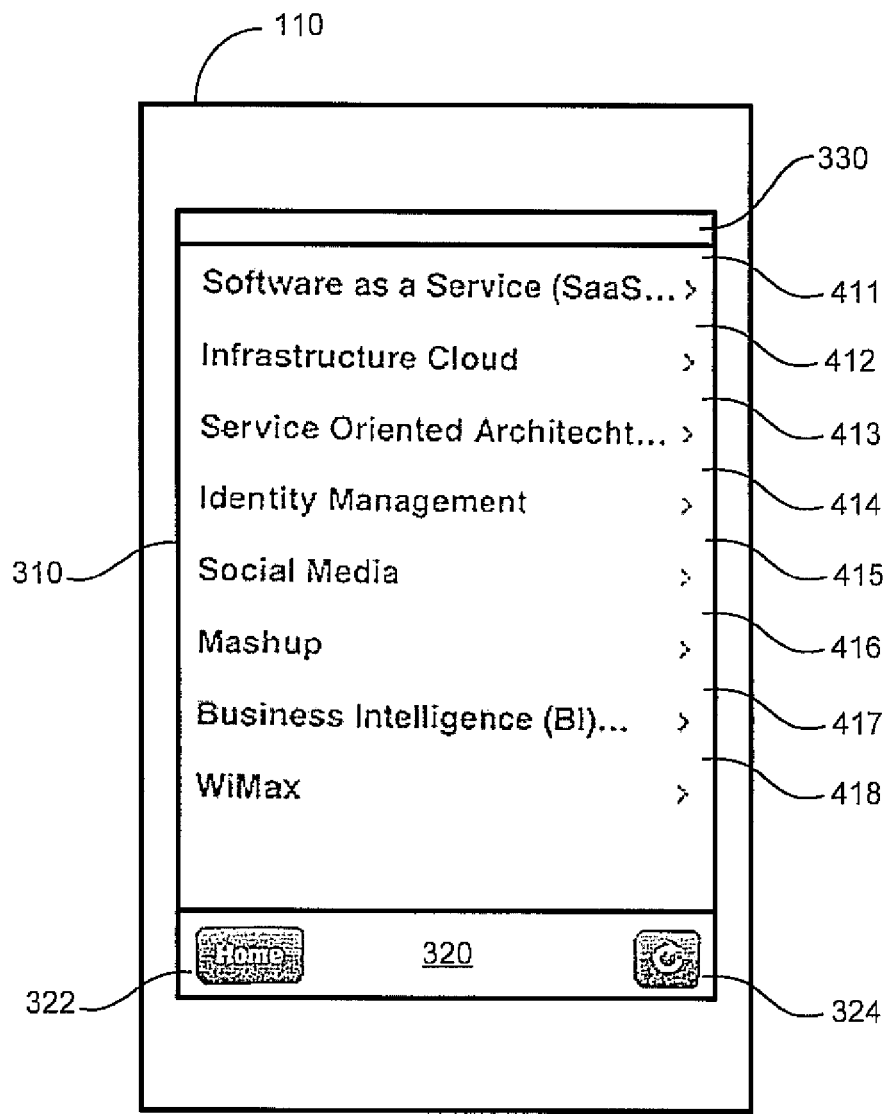
FIG. 4 shows a second exemplary graphical user interface of an exemplary display device in accordance with one embodiment of the present invention.

The native enterprise application (e.g., 211) may generate a graphical user interface (e.g., as shown in FIGS. 3 and 4) for enabling a user to initiate remote execution of an enterprise application and/or interact with one or more enterprise applications being executed on a remote system. For example, enterprise web content associated with a list of enterprise applications for execution may be communicated to the portable electronic device from the remote system. The enterprise web content may be rendered by the portable electronic device (e.g., using a web browser engine of the portable electronic device) to display a list of enterprise applications for selection by a user. The graphical user interface displaying the enterprise applications may have a "look and feel" similar to that of other native applications executable by the portable electronic device. In response to a user selecting an enterprise application from the list of enterprise applications displayed on the portable electronic device, data may be sent from the portable electronic device to a remote system for initiating execution of the enterprise application on the remote system.

During execution of the one or more enterprise applications (e.g., 121, 122, 123, etc.) on the remote system (e.g., 120), enterprise data may be accessed from a component of an enterprise backend (e.g., enterprise information database 131, legacy system 132, database server 133, email server 134, etc.). The enterprise applications (e.g., 121, 122, 123, etc.) may share data with one another, where the shared data may be stored on a memory of the portable electronic device (e.g., 110), a memory of the remote system (e.g., 120), on a memory of another system (e.g., communicatively coupled to the device 110 and/or the system 120), etc. The remote system (e.g., 120) may process the enterprise data and generate enterprise content (e.g., output from the enterprise applications). The enterprise content may be transformed (e.g., by transformation component 126) into enterprise web content (e.g., having a format such as XML, java, CSS, http, https, etc.) for rendering by and/or display on a portable electronic device (e.g., using a web browser engine of the portable electronic device). In this manner, user inputs to the portable electronic device (e.g., 110) from a user viewing the displayed enterprise web content may be communicated to the remote system (e.g., 120) for enabling a user to interact with the one or more enterprise applications executed by the remote system (e.g., 120).

FIG. 1 shows exemplary system 100 for providing access to enterprise data on a portable electronic device in accordance with one embodiment of the present invention. As shown in FIG. 1, portable electronic device 110 is disposed remotely from and communicatively coupled to system 120 via interface 115, while system 120 is communicatively coupled to enterprise backend 130 via interface 125. User inputs from portable electronic device 110 may be communicated to system 120, where the user inputs may be related to initiating execution of an enterprise application (e.g., 121, 122, 123, etc.) on system 120, interacting with one or more enterprise applications executing on system 120, etc. Additionally, enterprise web content may be communicated from system 120 to portable electronic device 110 for display thereon, where the enterprise web content may be used to display a listing of enterprise applications (e.g., selectable by a user of portable electronic device 110) for execution on system 120, to display updated data related to execution of an enterprise application on system 120 (e.g., generated in response to a user input to portable electronic device 110), etc. Accordingly, embodiments of the present invention may utilize processing and storage resources of a remote system (e.g., 120) for enabling a user to interact with an enterprise application (e.g., executed on remote system 120) and access enterprise data (e.g., accessed during execution of the enterprise application and communicated to the portable electronic device as enterprise web content for rendering thereon) using a portable electronic device (e.g., 110).

As shown in FIG. 1, enterprise backend 130 may provide access to a variety of enterprise data. Enterprise data may be any information related to a business. For example, enterprise information database 131 may store public information about a business (e.g., name, location, name of officers, information about competitors of a given business, etc.) and/or private information about a business (e.g., information about internal operations of the business, information collected from employees or contractors of the business, information related to client interactions, information related to interaction with suppliers or other business partners, etc.). In one embodiment, database 131 may be a SAP database, Oracle database, ERP database, CRM database, PLM database, SCM database, SRM database, or another database storing enterprise data. Enterprise backend 130 may also provide access to enterprise systems (e.g., legacy system 132, database server 133, email server 134) which may in turn provide access to other enterprise data. As such, a user of device 110 may access a variety of enterprise data.

System 120 may execute one or more of enterprise applications 121-123 using enterprise application processing component 125, where the one or more enterprise applications may be executed sequentially and/or contemporaneously. The one or more enterprise applications being executed on system 120 may access and/or process enterprise data (e.g., communicated from enterprise backend 130). For example, raw enterprise data (e.g., in the form of numbers, words, etc.) may be accessed and processed using one or more enterprise applications to generate enterprise content (e.g., processed enterprise data including charts, graphs or other information derived from the raw enterprise data).

The enterprise content (e.g., output from one or more of enterprise applications 121-123) may be used to generate enterprise web content using enterprise data transformation component 126. For example, enterprise content may be accessed in a first format directly from processing component 125, from memory 124, etc. Enterprise web content may be generated by component 126 based upon the enterprise data, where the enterprise web content is in a second format for rendering by and/or display on device 110. For example, the enterprise web content may be associated with a format such as XML, java, CSS, http, https, or another format which may be accessed and/or parsed by device 110.

System 120 also includes intra-enterprise application integration component 127 for enabling a plurality of enterprise applications to share data or otherwise function together. For example, a first enterprise application (e.g., 121) may access enterprise data (e.g., raw enterprise data accessed from backend 130) and/or enterprise content generated or accessed by a second enterprise application (e.g., 122) using component 127. The enterprise content or enterprise data may be accessed from a memory of system 120 (e.g., memory 124), a memory of device 110 (e.g., memory 240 of FIG. 2), or another memory accessible by one or more components of system 100. In this manner, component 127 may coordinate operation of a plurality of enterprise applications (e.g., 121, 122, 123, etc.) to enable a user of device 110 to access additional, richer, more complex or otherwise different enterprise data. Additionally, it should be appreciated that the data sharing between multiple enterprise applications may be implemented even where the device 110 may restrict and/or prohibit data sharing between native applications executed on the portable electronic device, and thus, a user of device 110 may initiate and/or interact with one or more enterprise applications which share data with one another.

Memory 124 may be used to store enterprise data, enterprise content, enterprise web content, or some combination thereof. For example, enterprise data may be stored in memory 124 and accessed in portions for processing by processing component 125. Memory 124 may store enterprise content for access and processing by component 126. As a further example, the enterprise content and/or enterprise web content may be formatted or partitioned to fit the display screen of portable electronic device 120, and thus, memory 124 may store portions of the enterprise content or enterprise web content to be subsequently communicated to device 110 for display thereon (e.g., in response to a user scrolling through information presented on device 110, in response to another user input to device 110, etc.).

System 120 may be implemented by a web server in one embodiment. Alternatively, system 120 may be an ERP server, CRM server, etc. And in other embodiments, system 120 may be another type of computer system and/or server.

As shown in FIG. 1, interface 115 and/or interface 125 may be a wired interface and/or a wireless interface. For example, data may be communicated over interface 115 and/or interface 125 in accordance with a wireless standard such as WiMAX, WLAN, WPAN, WMAN, etc. Interface 115 and/or interface 125 may comprise a GSM network, GPRS network, UMTS network, or the like. And in one embodiment, interface 115 and/or interface 125 may comprise a wired network such as a local area network (LAN), wide-area network (WAN), etc.

In one embodiment, interface 115 and/or interface 125 may include at least one insecure portion or reduced-security portion. For example, interface 115 and/or interface 125 may include the Internet, one or more demilitarized zones (DMZs), one or more proxy servers, etc. Accordingly, one or more trusted connections may be established between components of system 100 (e.g., device 110, system 120, enterprise backend 130, etc.) to more securely transfer data (e.g., enterprise data, enterprise content, enterprise web content, etc.). In one embodiment, a trusted connection between device 110 and system 120 (e.g., utilizing interface 115) may be established in accordance with security policies stored in device management database 128 of system 120, where the security policies are specific to device 110, a group of devices including device 110, etc. The security policies may be established by an enterprise information technology (IT) department and/or chief information officer (CIO) in one embodiment.

In another embodiment, a virtual private network (VPN) may be created for more securely transferring data between device 110 and system 120 using public networks, where the VPN is established using a portion of the native enterprise application running on device 110. The native enterprise application may also implement authentication procedures (e.g., to authenticate device 110 and/or system 120 before communicating sensitive data) and/or encryption procedures (e.g., encryption, decryption, etc.) with system 120 to further increase the security of data communicated between device 110 and system 120. Further, in one embodiment, the native enterprise application running on device 110 may utilize soft tokens or other security mechanisms to increase the security of data communicated between device 110 and system 120.

As shown in FIG. 1, system 120 also includes provisioning database 129. Database 129 may store information used to determine which enterprise applications (e.g., 121, 122, 123, etc.) a user of device 110 may initiate and/or interact with. For example, information stored in database 129 may be used to determine that a user of device 110 may initiate and/or interact with enterprise applications 121 and 122 (e.g., and not enterprise application 123), while information stored in database 129 may be used to determine that a user of another portable electronic device (e.g., communicatively coupled to system 120) may initiate and/or interact with enterprise applications 121 and 123 (e.g., and not enterprise application 122).

In this manner, embodiments enable a privilege level to be assigned to one device (e.g., 110), thereby creating a one-to-one relationship between a user and the device (e.g., 110) to enable only that user to authenticate and access enterprise data using the device (e.g., 110). Alternatively, embodiments enable a privilege level to be assigned to a group of devices (e.g., including device 110 and other devices).

In one embodiment, the privilege level assigned to device 110 may be determined during an authentication procedure implemented by the native enterprise application running on device 110. For example, a user may input login information (e.g., username, password, etc.), where the login information may be used to determine information about the user used to determine the privilege level assigned to device 110. For example, if it is determined that the user is an owner of a business as opposed to a lower-level employee of the business, device 110 may enable the user to interact with a larger number of enterprise applications. In one embodiment, the listing of enterprise applications displayed on device 110 for selection by the owner may be more extensive than a similar listing of enterprise applications displayed on another portable electronic device of the lower-level employee, thereby enabling a user to initiate and/or interact with only those enterprise applications associated with the privilege level of the device. Additionally, the privilege level assigned to device 110 may be stored in provisioning database 129 of system 120, a memory of device 110 (e.g., memory 240 of FIG. 2), etc. Further, the login information and/or information about a user may be communicated over the Internet (e.g., as part of interface 115), and therefore, the authentication procedure may be web-based in one embodiment.

Figure 2:
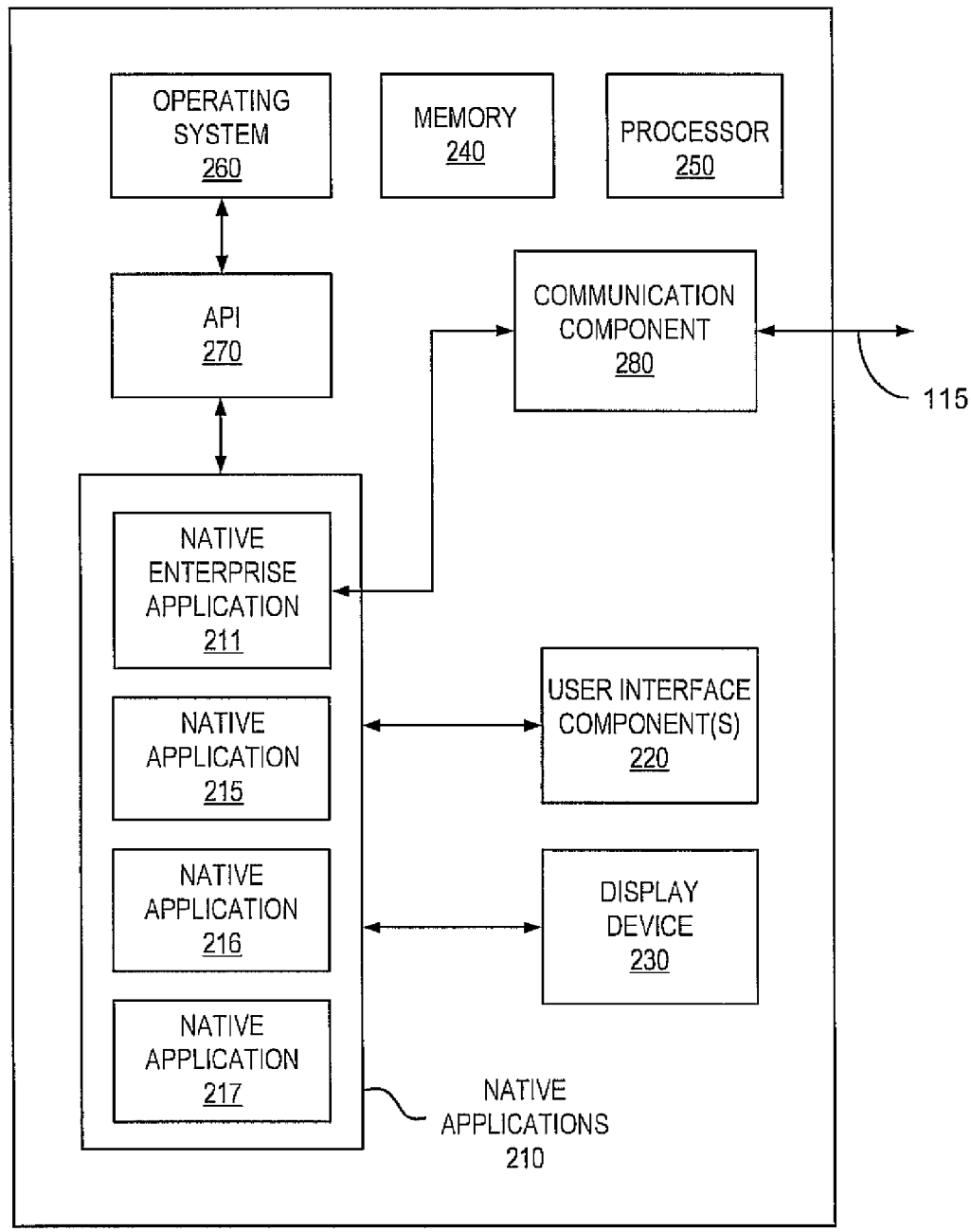
FIG. 2 shows an exemplary portable electronic device in accordance with one embodiment of the present invention.

Provisioning database 129 may also be used to implement one or more security measures to protect data on device 110 and/or to protect data accessed by device 110 using the native enterprise application (e.g., 211 of FIG. 2). For example, if it is determined that device 110 is lost, stolen, or otherwise in the hands of an unauthorized user, the data in provisioning database 129 may be updated to adjust the privilege level of the device such that device 110 has reduced or no access to enterprise data or other data from system 120. In this manner, memory (e.g., 240) or other components of the device 110 may be remotely locked or deleted (e.g., wiped) to make data (e.g., enterprise data) stored on device 110 inaccessible to an unauthorized user of the device (e.g., 110). And in one embodiment, if it is determined that device 110 is lost, stolen, or otherwise in the hands of an unauthorized user, the native enterprise application (e.g., 211 of FIG. 2) or other components of device 110 may cause data stored on device 110 (e.g., associated with enterprise data or other data from system 120) to be deleted (e.g., wiped) or otherwise rendered inaccessible (e.g., locked) in response to commands from system 120. It should be appreciated that the data (e.g., enterprise data) may be made inaccessible (e.g., by deleting, wiping, locking, etc.) to an unauthorized user of the device (e.g., 110) without affecting the execution of other applications (e.g., native applications 215, 216, 217, etc.) on the device (e.g., 110) in one embodiment.

As shown in FIG. 1, device application server 140 is coupled to device 110. Device application server 140 stores applications (e.g., native applications) for download and execution by device 110. In one embodiment, the native enterprise application run on device 110 (e.g., for enabling device 110 to provide access to enterprise data and/or enable user interaction with one or more enterprise applications) may be downloaded from server 140 via interface 116.

System 100 may also include computer system 150 coupled to device 110 via interface 117. Computer system 150 may be a personal computer system of the user of device 110, where system 150 is used to communicate data with device 110. For example, a user may synchronize data on device 110 with data stored on or accessed by system 150.

In one embodiment, interface 116 and/or 117 may be a wired interface and/or a wireless interface. For example, data may be communicated over interface 116 and/or interface 117 in accordance with a wireless standard such as WiMAX, WLAN, WPAN, WMAN, etc. Interface 116 and/or interface 117 may comprise a GSM network, GPRS network, UMTS network, or the like. In one embodiment, data may be communicated over interface 116 and/or interface 117 in accordance with a wired standard such as USB 1.1, USB 2.0, Firewire, PCI-Express, SATA, etc. And in one embodiment, interface 116 and/or interface 117 may comprise a wired network such as a local area network (LAN), wide-area network (WAN), etc.

Although FIG. 1 shows system 100 with a specific number and arrangement of components (e.g., 110, 120, 130, 140 and 150), it should be appreciated that system 100 may include a different number and/or arrangement of components in other embodiments. For example, it should be appreciated that a plurality of portable electronic devices (e.g., similar to and/or including device 110) may be communicatively coupled to system 120 in other embodiments. Additionally, although FIG. 1 shows each component of system 100 with a specific number and arrangement of sub-components (e.g., 131-134 of enterprise backend 130, 121-129 of system 120, etc.), it should be appreciated that one or more of the components of system 100 may include a different number or arrangement of sub-components in other embodiments.

FIG. 2 shows exemplary portable electronic device 110 in accordance with one embodiment of the present invention. Device 110 may be a mobile phone, a personal digital assistant, a media player (e.g., image viewer, movie viewer, music player, etc.), or the like. In other embodiments, device 110 may be any device which may be transported by a user.

As shown in FIG. 2, device 110 includes a plurality of native applications 210 which are stored locally in a memory of device 110 (e.g., memory 240) and executed by a processor (e.g., 250) of device 110. Native applications 210 may include native enterprise application 211, native application 215, native application 216, and native application 217. Native applications 215-217 may be calendar applications, email applications, games, or other applications associated with non-enterprise data. In one embodiment, native enterprise application 211 may enable a user to interact with enterprise applications (e.g., 121, 122, 123, etc.) and provide access to enterprise data. Additionally, in one embodiment, device 110 may restrict (e.g., limit, prohibit, etc.) communications and/or data sharing between applications 210 (e.g., native enterprise application 211, native application 215, native application 216, native application 217, some combination thereof, etc.).

Each of native applications 210 may cause user inputs from user interface components 220 to be accessed, and each of native applications 210 may cause data to be displayed on display device 230. Additionally, device includes operating system 260 which communicates with native applications 210 via application programming interface (API) 270. In one embodiment, API 270 may be provided as part of a software development kit (SDK) for enabling software developers to create native applications and/or enable the native applications to run on device 110.

Device 110 also includes communication component 280. In one embodiment, component 280 may include a web browser engine operable to access, parse or otherwise process web content. The web browser engine may be provided or otherwise implemented using an SDK (e.g., from the manufacturer of device 110). Accordingly, native enterprise application 211 may cause enterprise web content (e.g., generated by component 126 and communicated to device 110) to be displayed (e.g., on display device 230) using component 280 to read or prepare the enterprise web content for display. As such, in one embodiment, native enterprise application 211 may implement a container or mechanism for displaying the enterprise web content on device 110.

As shown in FIG. 2, user interface components 220 may include one or more mechanically-actuated user interface components (e.g., one or more physical keys of a keyboard) in one embodiment. In one embodiment, user interface components 220 may include a touchscreen (e.g., disposed over display device 230), where the touchscreen may enable selection of or interaction with regions of display screen 230. For example, a user may select a graphical button displayed on display screen 230 by interaction with a region of the touchscreen implemented by user interface components 220 which overlaps or otherwise corresponds to the graphical button. As a further example, a user may make gestures in proximity to or in contact with the touchscreen implemented by user interface components 220 to enable navigation through menus, to alter the display of the information on display screen 230 (e.g., to zoom, pan, etc.), or the like.

In one embodiment, user interface components 220 may include an audio input device such as a microphone. Alternatively, user interface components 220 may include a visual input device such as an optical sensor.

Display device 230 may be any type of display for displaying information to a user. For example, display 230 may be a liquid crystal display (LCD), field effect transistor (FET) display, light emitting diode (LED) display, organic light emitting diode (OLED) display, cathode ray tube (CRT) display, etc.

As discussed herein with respect to FIG. 1, native enterprise application 211 may increase the security of data (e.g., enterprise data, enterprise content, enterprise web content, etc.) by implementing a VPN between device 110 and system 120, authentication procedures for device 110 and/or system 120, encryption/decryption procedures for the data, or the like. Native enterprise application 211 may also increase the security of data (e.g., enterprise data, enterprise content, enterprise web content, etc.) by using soft tokens or other security mechanism for increasing the security of data.

Native enterprise application 211 may also enable data to be synchronized between device 110 and system 120. For example, if a user enters data (e.g., text) into device 110, the data entered by the user may be communicated to system 120 for synchronization thereof. As another example, if a user alters the display of data on device 110, data representing the alteration may be communicated to system 120 for synchronizing the data stored by system 120. And as a further example, if data is updated or otherwise changed by system 120, then the change may be communicated to device 110 for updating the enterprise web content displayed thereon and synchronizing it with the data stored in system 120.

Additionally, native enterprise application 211 may enable data sharing between enterprise applications (e.g., 121, 122, 123, etc.) executed on system 120. In one embodiment, native enterprise application 211 may operate in conjunction with an intra-enterprise application integration component (e.g., 127) of system 120 to implement the data sharing. The shared data may include enterprise data, enterprise content, enterprise web content, or some combination thereof. The shared data may be stored in a memory of device 110 (e.g., memory 240), a memory of system 120 (e.g., memory 124), etc. Accordingly, in one embodiment, data may be shared between enterprise applications even where device 110 does not permit data sharing between native applications 210 and/or does not permit contemporaneous execution of two or more of native applications 210.

In one embodiment, native enterprise application 211 may enable data sharing between applications 210 of device 110. For example, native enterprise application 211 may store data in a memory (e.g., 240 of device 110, a memory of system 120, etc.) for access by at least one native application (e.g., 215, 216, 217, etc.) during execution. Alternatively, during execution of native enterprise application 211, native enterprise application 211 may access data stored in a memory (e.g., 240 of device 110, a memory of system 120, etc.) by at least one native application (e.g., 215, 216, 217, etc.). In this manner, embodiments enable the sharing of data between applications 210 even in cases where the applications sharing data are not executed simultaneously.

Additionally, the user experience (e.g., the "look and feel" of the GUI for presenting enterprise web content) associated with native enterprise application 211 may be consistent with that of other native applications (e.g., 215-217) of device 110. For example, a GUI associated with the native enterprise application (e.g., a GUI as shown in FIG. 3 and/or FIG. 4) may be displayed on display device 230, where display device 230 is also used during execution of other native applications (e.g., 215-217) to display content. Additionally, the user interface elements (e.g., buttons, icons, images, text, menu elements, etc.) displayed during execution of native enterprise application 211 (e.g., one or more of enterprise user interface elements 311-318 of FIG. 3, one or more of native user interface elements 322 or 324 of FIG. 3, etc.) may be similar in appearance to the user interface elements generated by other native applications (e.g., 215-217). Further, the effect of certain commands or user inputs (e.g., specific finger movements or gestures, etc.) on the GUI associated with native enterprise application 211 may be similar to the effect that the same commands or user inputs have on a GUI associated with one or more of the other native applications (e.g., 215-217).

FIG. 3 shows a first exemplary graphical user interface of exemplary display device 110 in accordance with one embodiment of the present invention. As shown in FIG. 3, display screen 230 of device 110 displays a GUI with three regions (e.g., 310, 320 and 330). Region 310 is operable to display enterprise web content (e.g., communicated from system 120 to device 110) and includes enterprise user interface elements 311-318 generated by the native enterprise application (e.g., 211). Region 320 includes native user interface elements 322 and 324 generated by another component of device 110 (e.g., by operating system 260, API 270, etc.). Additionally, region 330 is operable to display other information (e.g., wireless signal strength associated with interface 115, the name of the wireless carrier providing the wireless service to implement interface 115, the current time, a battery level of device 110, etc.).

In one embodiment, enterprise user interface elements 311-318 may form a menu and correspond to enterprise applications (e.g., 121, 122, 123, some combination thereof, etc.) for selection by a user of device 110. In one embodiment, elements 311-314 may be icons corresponding to respective enterprise applications (e.g., 121, 122, 123, etc.), while elements 315-318 may be text descriptions corresponding to the respective enterprise applications (e.g., 121, 122, 123, some combination thereof, etc.). For example, interaction with element 311 and/or element 315 may initiate execution of enterprise application 121 on system 120, interaction with element 312 and/or element 316 may initiate execution of enterprise application 122 on system 120, and so on. Alternatively, interaction with elements 311-318 may cause a new menu (e.g., with different enterprise graphical user elements) to be displayed in region 310, where the new menu may be a sub-menu associated with a selected enterprise user interface element (e.g., 311-318).

As shown in FIG. 3, elements 311-318 may be arranged in a ring which may rotate to change the displayed user interface elements. For example, a first user interaction (e.g., a downward swipe of a finger, another gesture, another user interaction, etc.) with display screen 230 and/or a touch screen disposed thereon (e.g., as part of user interface components 220) may cause the ring to move downward. In this manner, elements 311-313 and elements 315-317 would shift downward to make room for the display of new user interface elements (e.g., displayed in the position occupied by elements 311 and 315 as depicted in FIG. 3) associated with a different enterprise application (e.g., executable by system 120). As a further example, a second user interaction (e.g., an upward swipe of a finger, another gesture, another user interaction, etc.) with display screen 230 and/or a touch screen disposed thereon (e.g., as part of user interface components 220) may cause the ring to move upward. In this manner, elements 312-314 and elements 316-318 would shift upward to make room for the display of new user interface elements (e.g., displayed in the position occupied by elements 314 and 318 as depicted in FIG. 3) associated with a different enterprise application (e.g., executable by system 120). Accordingly, embodiments provide convenient mechanisms for using a portable electronic device (e.g., 110) to enable selection of one or more enterprise applications for execution on a system (e.g., 120) disposed remotely from the portable electronic device (e.g., 110).

In one embodiment, enterprise user interface elements 311-318 may be associated with enterprise content generated during execution of an enterprise application (e.g., 121, 122, 123, etc.) and/or enterprise data (e.g., accessed from enterprise backend 130 during execution of the enterprise application). For example, elements 311-318 may be displayed on display 230 after initiating execution of an enterprise application on system 120. Enterprise content may be generated by system 120 during execution of an enterprise application (e.g., 121, 122, 123, etc.), where the enterprise content is associated with enterprise data (e.g., is a chart, graph, etc. generated based upon the enterprise data, is a reformatted version of text, numbers or other enterprise data, etc.) accessed from enterprise backend 130 during execution of the enterprise application. Enterprise web content may be generated based upon the enterprise content (e.g., by processing component 125, transformation component 126, etc.), where the enterprise web content may be communicated to device 110 for displaying elements 311-318. The enterprise web content may be displayed on device 110 by a native enterprise application (e.g., 211) in conjunction with a communication component of device 110 (e.g., 280) used to parse or otherwise process the enterprise web content for display. In this manner, embodiments provide convenient mechanisms for using a portable electronic device (e.g., 110) to enable selection of one or more enterprise applications for execution on a system (e.g., 120) disposed remotely from the portable electronic device (e.g., 110).

As shown in FIG. 3, native user interface elements 322 and 324 may be used to interact with enterprise web content displayed in region 310 by the native enterprise application (e.g., 211). For example, element 322 may be a "home button" for returning a user to return to a "home" screen associated with the native enterprise application (e.g., 211). In one embodiment, a "home" screen associated with execution of a native enterprise application (e.g., 211) may be a menu for selecting enterprise applications for execution, where the menu is displayed in region 310 in response to an interaction with element 322. Additionally, the "home" screen associated with execution of a native enterprise application (e.g., 211) may be displayed in response to an interaction with element 322 without leaving interrupting execution of the native enterprise application (e.g., 211) in one embodiment.

As another example, element 324 may be a "back button" for recalling the display of previously-displayed data associated with the native enterprise application (e.g., 211). In one embodiment, interaction with element 324 may initiate display of previously-displayed enterprise web content (e.g., enterprise web content associated with enterprise content generated during execution of a enterprise application, enterprise web content associated with a menu for selecting enterprise applications for execution, etc.) in region 310. In one embodiment, a program portion of the native enterprise application (e.g., 211) may include code and/or logic for tracking navigation through a menu hierarchy or other data of the enterprise web content, thereby enabling the native enterprise application (e.g., 211) to recall the previously-displayed enterprise web content (e.g., in response to a user interaction with element 324).

The native user interface elements (e.g., 322, 324, etc.) may be generated by the native enterprise application (e.g., 211). Additionally, in one embodiment, the native user interface elements (e.g., 322, 324, etc.) may be specific to (e.g., exclusively used by, exclusively accessed by, etc.) the native enterprise application (e.g., 211), and therefore, not used or accessed by other native applications (e.g., one or more of native applications 210).

Although FIG. 3 shows a specific number and arrangement of graphical user interface elements (e.g., 311-318, 322, 324, etc.), it should be appreciated that a different number and/or arrangement of graphical user interface elements may be used in other embodiments. Additionally, it should be appreciated that a different functionality may be attributed to one or more of the graphical user interface elements (e.g., 311-318, 322, 324, etc.) and/or a set of graphical user interface elements with different functionalities may be used in other embodiments. For example, native user interface elements 322 and/or 324 may be assigned different functionalities. Alternatively, additional and/or different native user interface elements may be displayed (e.g., in region 320), where the additional and/or different native user interface elements may be associated with different functionality than elements 322 and 324.

FIG. 4 shows a second exemplary graphical user interface for exemplary display device 110 in accordance with one embodiment of the present invention. The graphical user interface depicted in FIG. 4 is similar to that depicted in FIG. 3, except that the GUI of FIG. 4 has different enterprise graphical user elements than that of FIG. 3. For example, region 310 as shown in FIG. 4 includes enterprise graphical user elements 411-418.

In one embodiment, elements 411-418 may form a list-based menu which may be scrolled by a user to display different user interface elements. For example, a first user interaction (e.g., a downward swipe of a finger, another gesture, another user interaction, etc.) with display screen 230 and/or a touch screen disposed thereon (e.g., as part of user interface components 220) may cause the list-based menu to scroll downward. In this manner, elements 411-417 would shift downward to make room for the display of new user interface elements (e.g., displayed in the position occupied by element 411 as depicted in FIG. 4). As a further example, a second user interaction (e.g., an upward swipe of a finger, another gesture, another user interaction, etc.) with display screen 230 and/or a touch screen disposed thereon (e.g., as part of user interface components 220) may cause the list-based menu to scroll upward. In this manner, elements 412-418 would shift upward to make room for the display of new user interface elements (e.g., displayed in the position occupied by element 418 as depicted in FIG. 4). Additionally, the newly-displayed user interface elements may correspond to a different enterprise application executed on the remote system (e.g., 120).

In one embodiment, enterprise user interface elements 411-418 may correspond to enterprise applications (e.g., 121, 122, 123, etc.) for selection by a user of device 110. For example, interaction with element 411 may initiate execution of enterprise application 121 on system 120, interaction with element 412 may initiate execution of enterprise application 122 on system 120, and so on. Alternatively, interaction with elements 411-418 may cause a new menu (e.g., with different enterprise graphical user elements) to be displayed in region 310, where the new menu may be a sub-menu associated with a selected enterprise user interface element (e.g., 411-418).

In one embodiment, enterprise user interface elements 411-418 may be associated with enterprise content generated during execution of an enterprise application (e.g., 121, 122, 123, etc.) and/or enterprise data (e.g., accessed from enterprise backend 130 during execution of the enterprise application). For example, elements 411-418 may be displayed on display 230 after initiating execution of an enterprise application on system 120. Enterprise content may be generated by system 120 during execution of an enterprise application (e.g., 121, 122, 123, etc.), where the enterprise content is associated with enterprise data (e.g., is a chart, graph, etc. generated based upon the enterprise data, is a reformatted version of text, numbers or other enterprise data, etc.) accessed from enterprise backend 130 during execution of the enterprise application. Enterprise web content may be generated based upon the enterprise content (e.g., by processing component 125, transformation component 126, etc.), where the enterprise web content may be communicated to device 110 for displaying elements 411-418. The enterprise web content may be displayed on device 110 by a native enterprise application (e.g., 211) in conjunction with a communication component of device 110 (e.g., 280) used to parse or otherwise process the enterprise web content for display. In this manner, embodiments provide convenient mechanisms for using a portable electronic device (e.g., 110) to enable selection of one or more enterprise applications for execution on a system (e.g., 120) disposed remotely from the portable electronic device (e.g., 110).

Although FIG. 4 shows a specific number and arrangement of graphical user interface elements (e.g., 411-418, 322, 324, etc.), it should be appreciated that a different number and/or arrangement of graphical user interface elements may be used in other embodiments. Additionally, it should be appreciated that a different functionality may be attributed to one or more of the graphical user interface elements (e.g., 411-418, 322, 324, etc.) and/or a set of graphical user interface elements with different functionalities may be used in other embodiments. For example, native user interface elements 322 and/or 324 may be assigned different functionalities. Alternatively, additional and/or different native user interface elements may be displayed (e.g., in region 320), where the additional and/or different native user interface elements may be associated with different functionality than elements 322 and 324.

Additionally, native user interface elements 322 and 324 may be user customizable in one embodiment. For example, a user of native enterprise application 211 may define the number and/or functionality of native user interface elements (e.g., similar to elements 322 and/or 324) used during execution of native enterprise application 211.

Further, enterprise user interface elements (e.g., elements 311-318 of FIG. 3, elements 411-418 of FIG. 4, etc.) may be user customizable in one embodiment. For example, a user of native enterprise application 211 may define the number and/or functionality of enterprise user interface elements (e.g., similar to elements 311-318 of FIG. 3, elements 411-418 of FIG. 4, etc.) used during execution of native enterprise application 211.

Figure 5:
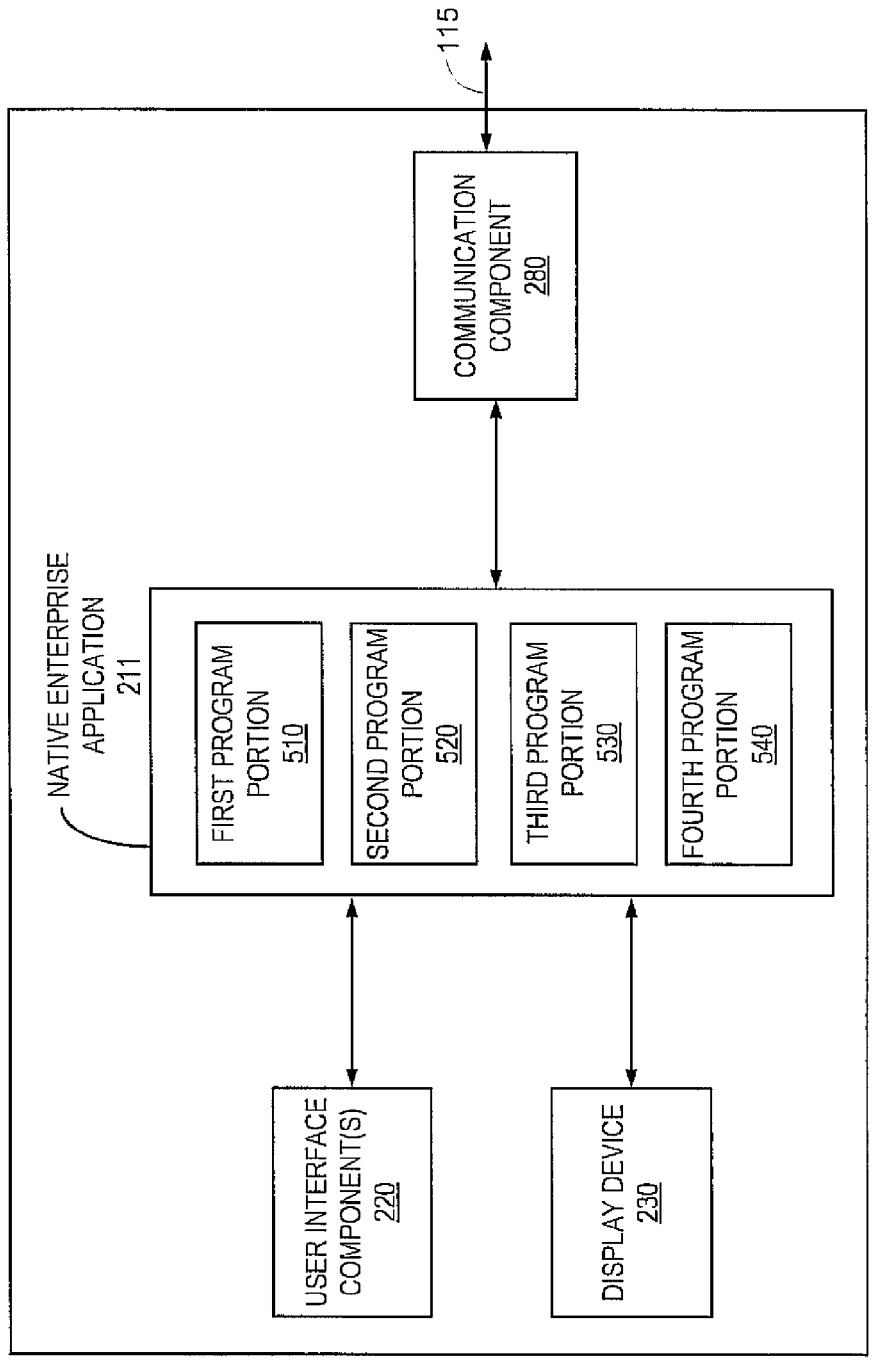
FIG. 5 shows an exemplary portable electronic device with a plurality of native enterprise application program portions in accordance with one embodiment of the present invention.

FIG. 5 shows exemplary portable electronic device 110 with a plurality of native enterprise application program portions in accordance with one embodiment of the present invention. As shown in FIG. 5, native enterprise application 211 includes first program portion 510, second program portion 520, third program portion 530 and fourth program portion 540. In one embodiment, each of program portions 510-540 may correspond to a different enterprise application (e.g., 121, 122, 123, etc.) executed by a remote system (e.g., 120) in one embodiment. For example, first program portion 510 may correspond to enterprise application 121 (e.g., by system 120), second program portion 520 may correspond to enterprise application 122 (e.g., by system 120), and so on.

In one embodiment, program portions 510-540 may be used to perform operations associated with an enterprise application or otherwise process data output during execution of the enterprise application. For example, program portions 510-540 may communicate data between interface components of device 110 (e.g., user interface components 220, display device 230, etc.) and communication component 280 during execution of a respective enterprise application on system 120. As a further example, data (e.g., enterprise data, enterprise content, enterprise web content, etc.) received over interface 115 from system 120 may be further processed by one or more of program portions 510-540 associated with the one or more enterprise applications being executed (e.g., by system 120) during generation of the data. In this manner, processing of the enterprise data and/or execution of the enterprise applications may be shared between the portable electronic device (e.g., 110) and the remote system (e.g., 120). In one embodiment, the amount of processing performed by each of device 110 and system 120 may be dynamically varied.

Although FIG. 5 shows native enterprise application with only four program portions (e.g., 510-540), it should be appreciated that native enterprise application 211 may include a smaller or larger number of program portions in other embodiments. Additionally, it should be appreciated that one or more of the program portions of native enterprise application 211 may be assigned responsibilities or functions different than those of program portions 510-540 in other embodiments. For example, one program portion of native enterprise application 211 may implement a dedicated interface layer for communicating with peripherals such as user interface components 220, display device 230, etc., while other program portions (e.g., 510, 520, 530, 540, etc.) may be responsible for processing data associated with initiation and/or execution of enterprise applications (e.g., 121, 122, 123, etc.).

Figure 6A:
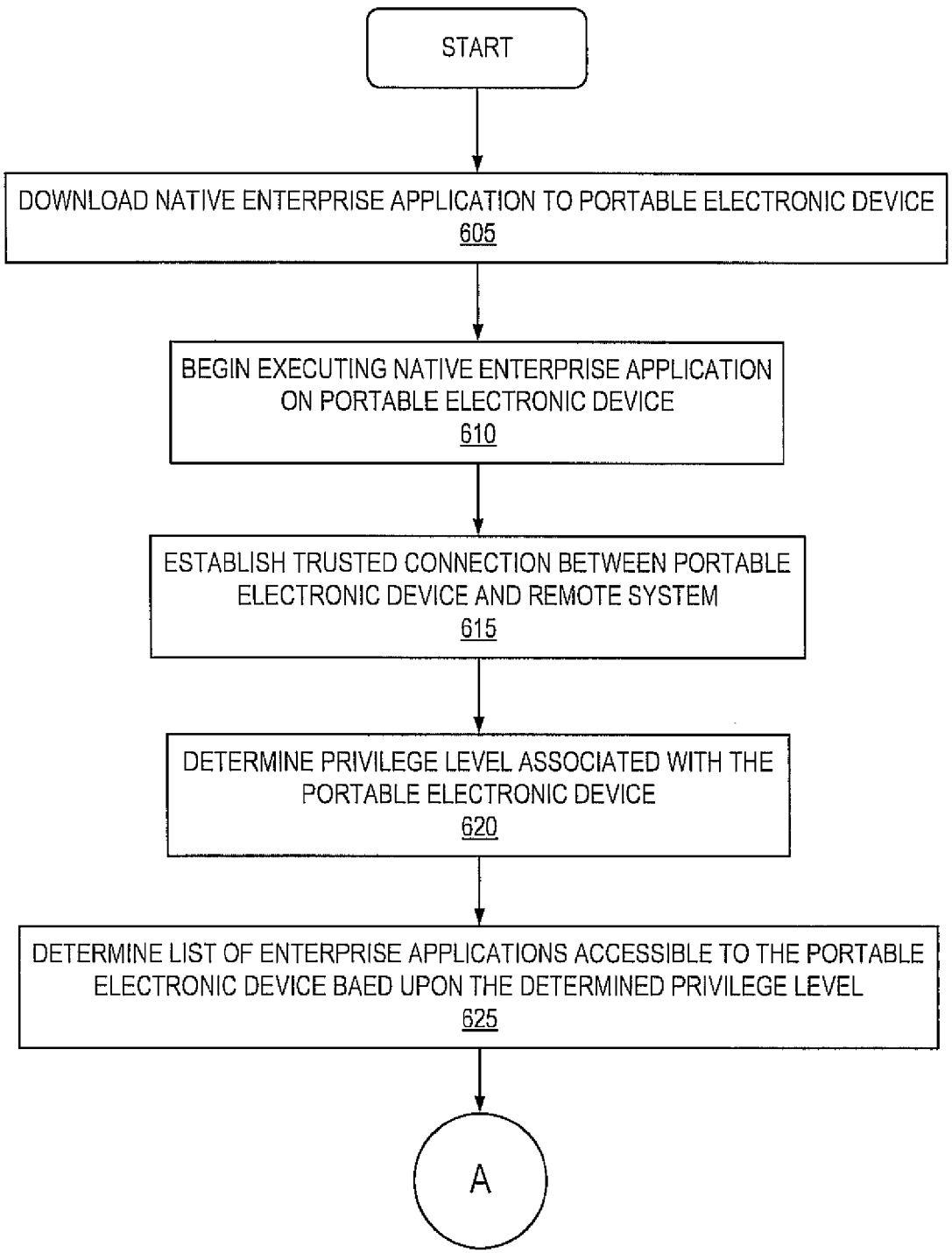
FIG. 6A shows a first portion of a flowchart of an exemplary computer-implemented process for enabling a user to interact with an enterprise application and access enterprise data in accordance with one embodiment of the present invention.

FIGS. 6A, 6B, 6C and 6D show a flowchart of exemplary computer-implemented process 600 for enabling a user to interact with an enterprise application and access enterprise data in accordance with one embodiment of the present invention. As shown in FIG. 6A, step 605 involves downloading a native enterprise application (e.g., 211) to a portable electronic device (e.g., 110). The native enterprise application may be downloaded from a device application server (e.g., 140) in one embodiment.

Step 610 involves beginning execution of the native enterprise application on the portable electronic device. The native enterprise application (e.g., 211) may be executed by a processor (e.g., 250) of the portable electronic device.

As shown in FIG. 6A, step 615 involves establishing a trusted connection between the portable electronic device (e.g., 110) and the remote system (e.g., 120). In one embodiment, the trusted connection may be established in accordance with security policies established by the native enterprise application (e.g., 211). Additionally, the trusted connection may enable sensitive data to be communicated over one or more public networks between the portable electronic device (e.g., 110) and the remote system (e.g., 120) with increased security.

Step 620 involves determining a privilege level associated with the portable electronic device. In one embodiment, the privilege level of the device (e.g., 110) may be determined by or otherwise associated with information about the user, where the user may be identified by login information submitted to the portable electronic device (e.g., 110) and/or the remote system (e.g., 120).

As shown in FIG. 6A, step 625 involves determining a list of enterprise applications accessible to the portable electronic device (e.g., 110) based upon the determined privilege level (e.g., determined in step 620). In one embodiment, a database (e.g., provisioning database 129) may be indexed (e.g., with a device identifier associated with device 110, a user identifier, privilege level data determined in step 620, some combination thereof, etc.) to determine a list of enterprise applications accessible to the portable electronic device (e.g., 110).

Figure 6B:
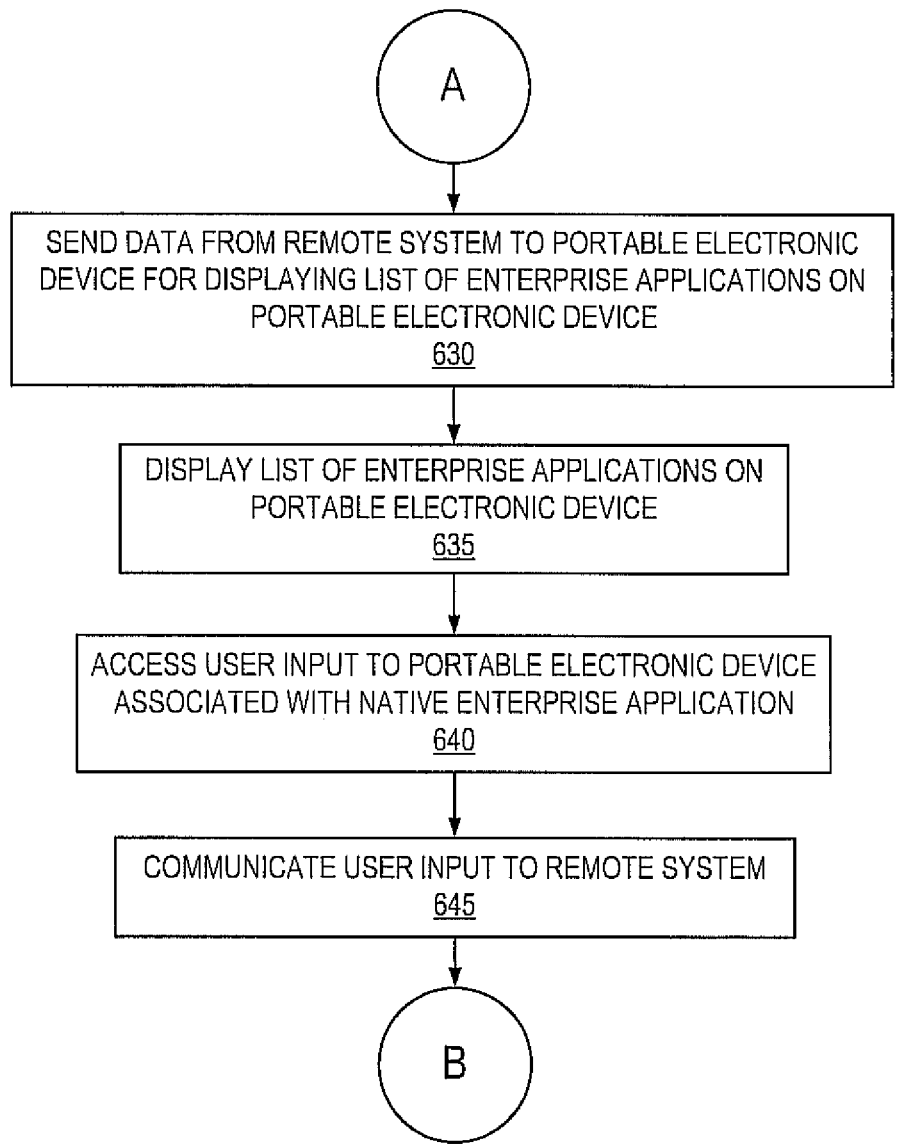
FIG. 6B shows a second portion of a flowchart of an exemplary computer-implemented process for enabling a user to interact with an enterprise application and access enterprise data in accordance with one embodiment of the present invention.

As shown in FIG. 6B, step 630 involves sending data (e.g., enterprise web content) from the remote system (e.g., 120) to the portable electronic device (e.g., 110) for displaying a list of enterprise applications (e.g., corresponding to the list determined in step 625) on the portable electronic device (e.g., 110). In one embodiment, enterprise web content may be generated based upon the list of enterprise applications determined in step 625, where the enterprise web content may be communicated in step 630 to the portable electronic device for rendering by and/or display thereon.

Step 635 involves displaying the list of enterprise applications on the portable electronic device (e.g., 110). In one embodiment, the list of enterprise applications may be displayed as a plurality of user interface elements arranged in a ring (e.g., as shown in FIG. 3), where each of the user interface elements may be selected by a user to initiate execution (e.g., on system 120) of an enterprise application associated with the selected user interface element. Alternatively, the list of enterprise applications may be displayed as a plurality of user interface elements arranged as a list-based menu (e.g., as shown in FIG. 4), where each of the user interface elements may be selected by a user to initiate execution (e.g., on system 120) of an enterprise application associated with the selected user interface element.

As shown in FIG. 6B, step 640 involves accessing a user input to the portable electronic device associated with the native enterprise application (e.g., 211). The user input may involve an interaction with at least one user interface component (e.g., 220) of the portable electronic device (e.g., 110). In one embodiment, the user input may be associated with updating the list of displayed enterprise applications (e.g., in response to a request to rotate the ring shown in FIG. 3, in response to a request to scroll the list-based menu shown in FIG. 4, etc.). Alternatively, the user input may be associated with a selection of an enterprise application to be executed on a remote system (e.g., 120). And in one embodiment, the user input may be associated with performing processing associated with the user input to generate other enterprise content (e.g., during execution of an enterprise application by system 120).

Step 645 involves communicating the user input to the remote system (e.g., 120). The user input may be communicated over an interface (e.g., 115) coupling the portable electronic device (e.g., 110) to the remote system (e.g., 120).

Figure 6C:
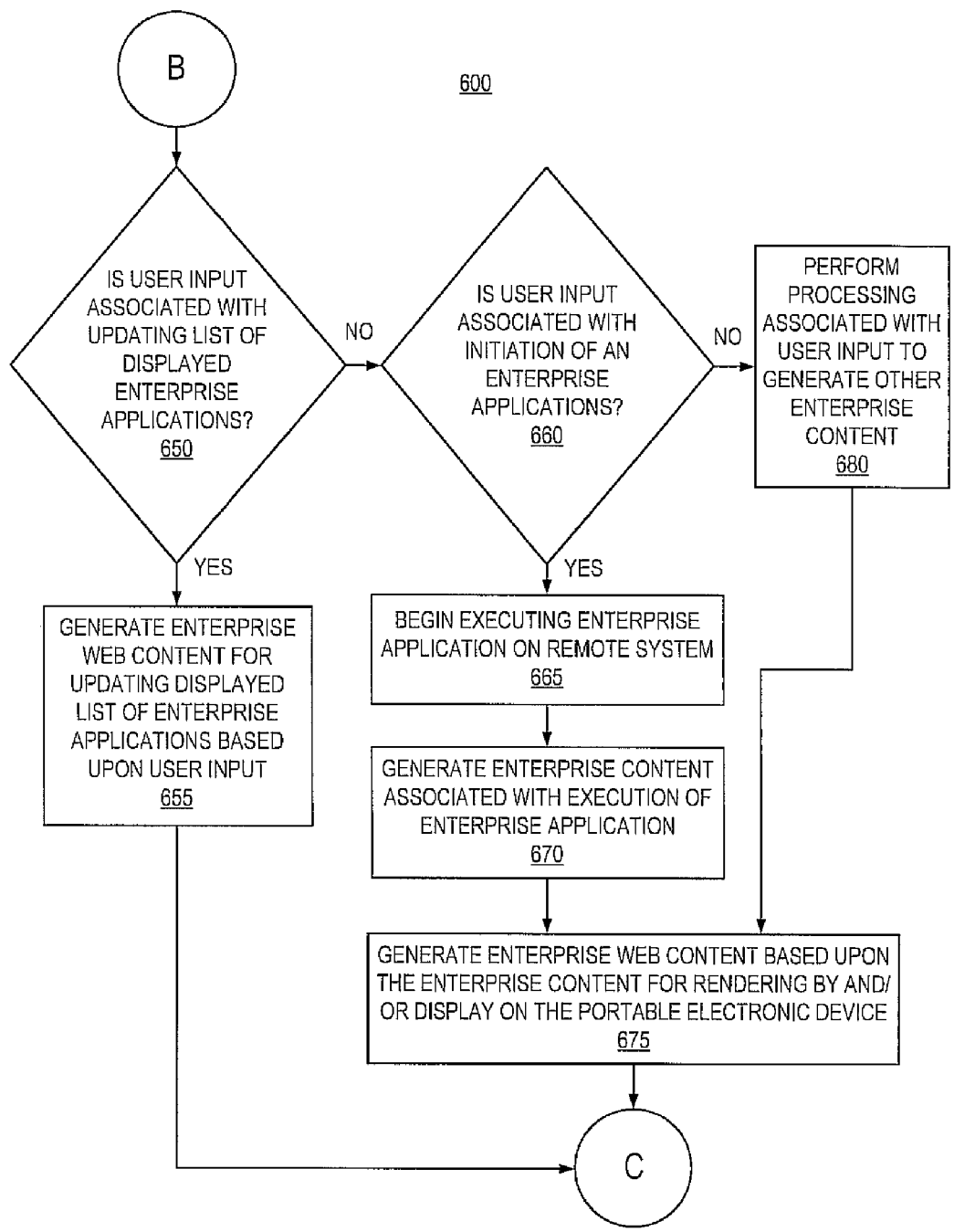
FIG. 6C shows a third portion of a flowchart of an exemplary computer-implemented process for enabling a user to interact with an enterprise application and access enterprise data in accordance with one embodiment of the present invention.

As shown in FIG. 6C, step 650 involves determining whether the user input is associated with updating the list of enterprise applications displayed on the portable electronic device. If it is determined in step 650 that the user input is associated with updating the list of enterprise applications displayed on the portable electronic device (e.g., in response to a request to rotate the ring shown in FIG. 3, in response to a request to scroll the list-based menu shown in FIG. 4, etc.), then enterprise web content for updating the displayed list of enterprise applications may be generated in step 655 before performing step 685 of FIG. 6D. The enterprise web content generated in step 655 may have a format different from that of the enterprise content, where the format of the enterprise web content may be XML, CSS, java, http, https, etc. In one embodiment, if it is determined in step 650 that the user input is associated with updating the list of enterprise applications displayed on the portable electronic device and enterprise web content for displaying the updated list of enterprise applications is already stored on the portable electronic device, then the stored enterprise web content may be displayed on the portable electronic device (e.g., thereby skipping one or more of steps 655-690). Alternatively, if it is determined in step 650 that the user input is not associated with updating the list of enterprise applications displayed on the portable electronic device, then step 660 may be performed.

Step 660 involves determining whether the user input is associated with initiation of an enterprise application. If it is determined that the user input is associated with initiation of an enterprise application, then the enterprise application may begin executing on the remote system (e.g., 120) in step 665. Enterprise content associated with execution of the enterprise application may be generated in step 670. In step 675, enterprise web content may be generated (e.g., by transformation component 126) based upon the enterprise content for rendering by and/or display on the portable electronic device. The enterprise web content generated in step 675 may have a format different from that of the enterprise content, where the format of the enterprise web content may be XML, CSS, java, http, https, etc. Alternatively, if it is determined in step 660 that the user input is not associated with initiation of an enterprise application, then step 680 may be performed.

As shown in FIG. 6C, step 680 involves performing processing associated with the user input to generate other enterprise content. For example, where the user input is associated with altering the display of enterprise data during execution of the enterprise application, then processing may be performed in step 680 to generate the other enterprise content using the enterprise application to enable the portable electronic device to correctly display the data associated with the user input. As a more specific example, if the user input is a request to display a certain portion of enterprise data on the portable electronic device, then processing may be performed in step 680 to generate enterprise content to enable the portable electronic device to display the portion of enterprise data. After performing step 680, enterprise web content may be generated (e.g., by transformation component 126) in step 675 based upon the other enterprise content (e.g., generated in step 680) for rendering by and/or display on the portable electronic device.

Figure 6D:
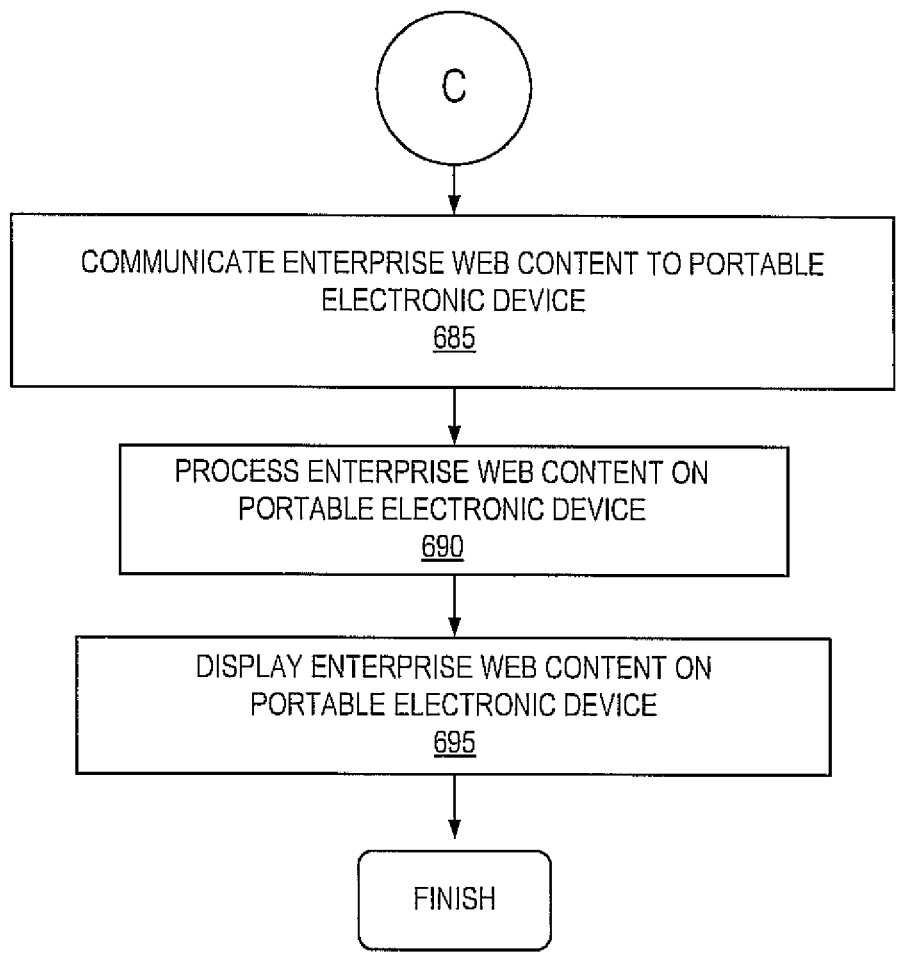
FIG. 6D shows a fourth portion of a flowchart of an exemplary computer-implemented process for enabling a user to interact with an enterprise application and access enterprise data in accordance with one embodiment of the present invention.

As shown in FIG. 6D, step 685 involves communicating the enterprise web content (e.g., generated in step 655 and/or step 675) to the portable electronic device. The enterprise web content may be communicated in step 685 over interface 115 in one embodiment.

Step 690 involves processing the enterprise web content on the portable electronic device. For example, the enterprise web content may be parsed by a communication component (e.g., 280) of the portable electronic device. Alternatively, additional processing may be performed on the data by a program portion (e.g., 510, 520, 530, 540, etc.) of the native enterprise application (e.g., 211), thereby sharing the processing of the enterprise data and/or sharing execution of the enterprise application with the remote system (e.g., 120).

As shown in FIG. 6D, step 695 involves displaying the enterprise web content on the portable electronic device. The enterprise web content may be displayed on a display device (e.g., 230) of the portable electronic device by the native enterprise application using a web browser engine of the portable electronic device in one embodiment. Additionally, in one embodiment, the enterprise web content may be displayed to form a graphical user interface as shown in FIG. 3, FIG. 4, or the like.

Figure 7:
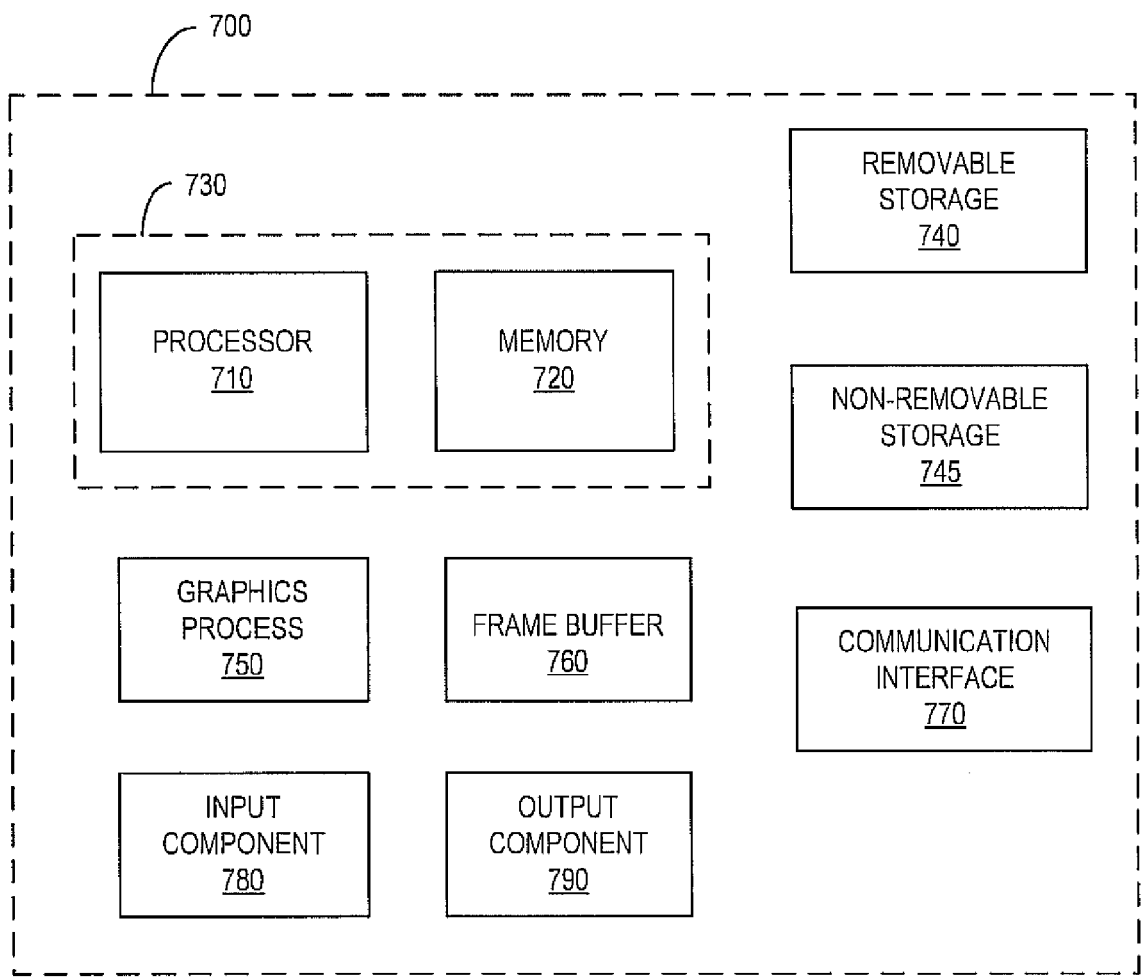
FIG. 7 shows an exemplary computer system platform upon which embodiments of the present invention may be implemented.

FIG. 7 shows exemplary general purpose computer system platform 700 upon which embodiments of the present invention may be implemented. For example, computer system 700 may be used to implement one or more components of device 110, system 120, enterprise backend 130, or some combination thereof.

As shown in FIG. 7, portions of the present invention are comprised of computer-readable and computer-executable instructions that reside, for example, in computer system platform 700 and which may be used as a part of a general purpose computer network (not shown). It is appreciated that computer system platform 700 of FIG. 7 is merely exemplary. As such, the present invention can operate within a number of different systems including, but not limited to, general-purpose computer systems, embedded computer systems, laptop computer systems, hand-held computer systems, portable computer systems, and stand-alone computer systems, for instance.

In one embodiment, depicted by dashed lines 730, computer system platform 700 may comprise at least one processor 710 and at least one memory 720. Processor 710 may comprise a central processing unit (CPU) or other type of processor. Depending on the configuration and/or type of computer system environment, memory 720 may comprise volatile memory (e.g., RAM), non-volatile memory (e.g., ROM, flash memory, etc.), or some combination of the two. Additionally, memory 720 may be removable, non-removable, etc.

In other embodiments, computer system platform 700 may comprise additional storage (e.g., removable storage 740, non-removable storage 745, etc.). Removable storage 740 and/or non-removable storage 745 may comprise volatile memory, non-volatile memory, or any combination thereof. Additionally, removable storage 740 and/or non-removable storage 745 may comprise CD-ROM, digital versatile disks (DVD) or other optical storage, magnetic cassettes, magnetic tape, magnetic disk storage or other magnetic storage devices, or any other medium which can be used to store information for access by computer system platform 700.

As shown in FIG. 7, computer system platform 700 may communicate with other systems, components, or devices via communication interface 770. Communication interface 770 may embody computer readable instructions, data structures, program modules or other data in a modulated data signal (e.g., a carrier wave) or other transport mechanism. By way of example, and not limitation, communication interface 770 may couple to wired media (e.g., a wired network, direct-wired connection, etc.) and/or wireless media (e.g., a wireless network, a wireless connection utilizing acoustic, RF, infrared, or other wireless signaling, etc.).

Input component 780 may include any component for enabling a user, system, etc. to provide an input to system 700. For example, input component 780 may include a keyboard, mouse, pen, voice input device (e.g., microphone), touch input device (e.g., touchscreen), visual input device (e.g., optical sensor, camera, etc.), accelerometer, proximity sensor, some combination thereof, etc.

As shown in FIG. 7, output component 790 may include any component for enabling system 700 to provide an output to a user, system, etc. For example, output component 790 may include a display device (e.g., LCD, LED, OLED, plasma, CRT, etc.), speaker, printer, some combination thereof, etc.

Graphics processor 750 may perform graphics processing operations on graphical data stored in frame buffer 760 or another memory (e.g., 720, 740, 745, etc.) of computer system platform 700. Graphical data stored in frame buffer 760 may be accessed, processed, and/or modified by components (e.g., graphics processor 750, processor 710, etc.) of computer system platform 700 and/or components of other systems/devices. Additionally, the graphical data may be accessed (e.g., by graphics processor 750) and displayed on an output device coupled to computer system platform 700. Accordingly, memory 720, removable storage 740, non-removable storage 745, fame buffer 760, or a combination thereof, may comprise instructions that when executed on a processor (e.g., 710, 750, etc.) implement a method of enabling a user to interact with an enterprise application and access enterprise data (e.g., in accordance with process 600 of FIGS. 6A-6D).

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A computer-implemented method for circumventing a data sharing prohibition between native applications on a mobile device, the method comprising:
   invoking a first native application on a mobile device;
   receiving, by the first native application, particular enterprise data from a first, server-based enterprise application that is in communication with the first native application;
   processing the particular enterprise data by the first native application;
   invoking a second native application on the mobile device, wherein the second native application is prohibited by an operating system on the mobile device from sharing enterprise data with the first native application;

receiving, by the second native application, the particular enterprise data from a second, server-based enterprise application that (i) is in communication with the second native application, and (ii) is not prohibited from sharing enterprise data with the first, server-based enterprise application; and processing the particular enterprise data by the second native application.

2. The method of claim 1 wherein receiving, by the second native application, the particular enterprise data from the second, server-based enterprise application comprises receiving, by the second native application, the particular enterprise data from the second, server-based enterprise application without directly receiving the particular enterprise data by the second native application from the first native application.

3. The method of claim 1 wherein the first native application is an application other than a web browser.

4. The method of claim 1 comprising:
executing the first native application on the mobile device; and
executing the second native application on the mobile device, wherein the second native application is not executed concurrently with the first native application.

5. The method of claim 1 comprising:
receiving, by the first native application, input indicating an update for the particular enterprise data; and
providing, by the first native application, the update for the particular enterprise data to the first, server-based enterprise application, wherein receiving, by the second native application, the particular enterprise data from the second, server-based enterprise application comprises receiving the updated particular enterprise data.

6. The method of claim 1 comprising:
providing, in response to invoking the first native application on the mobile device, data to a server indicating that the server should execute the first, server-based enterprise application.

7. A system comprising:
one or more computers and one or more storage devices storing instructions that are operable, when executed by the one or more computers, to cause the one or more computers to perform operations comprising:
invoking a first native application on a mobile device;
receiving, by the first native application, particular enterprise data from a first, server-based enterprise application that is in communication with the first native application;
processing the particular enterprise data by the first native application;
invoking a second native application on the mobile device, wherein the second native application is prohibited by an operating system on the mobile device from sharing enterprise data with the first native application;
receiving, by the second native application, the particular enterprise data from a second, server-based enterprise application that (i) is in communication with the second native application, and (ii) is not prohibited from sharing enterprise data with the first, server-based enterprise application; and processing the particular enterprise data by the second native application.

8. The system of claim 7 wherein receiving, by the second native application, the particular enterprise data from the second, server-based enterprise application comprises receiving, by the second native application, the particular enterprise data from the second, server-based enterprise application without directly receiving the particular enterprise data by the second native application from the first native application.

9. The system of claim 7 wherein the first native application is an application other than a web browser.

10. The system of claim 7 the operations comprising:
executing the first native application on the mobile device; and
executing the second native application on the mobile device, wherein the second native application is not executed concurrently with the first native application.

11. The system of claim 7 the operations comprising:
receiving, by the first native application, input indicating an update for the particular enterprise data; and
providing, by the first native application, the update for the particular enterprise data to the first, server-based enterprise application, wherein receiving, by the second native application, the particular enterprise data from the second, server-based enterprise application comprises receiving the updated particular enterprise data.

12. The system of claim 7 the operations comprising:
providing, in response to invoking the first native application on the mobile device, data to a server indicating that the server should execute the first, server-based enterprise application.

13. A non-transitory computer-readable medium storing software comprising instructions executable by one or more computers which, upon such execution, cause the one or more computers to perform operations comprising:
invoking a first native application on a mobile device;
receiving, by the first native application, particular enterprise data from a first, server-based enterprise application that is in communication with the first native application;
processing the particular enterprise data by the first native application;
invoking a second native application on the mobile device, wherein the second native application is prohibited by an operating system on the mobile device from sharing enterprise data with the first native application;
receiving, by the second native application, the particular enterprise data from a second, server-based enterprise application that (i) is in communication with the second native application, and (ii) is not prohibited from sharing enterprise data with the first, server-based enterprise application; and
processing the particular enterprise data by the second native application.

14. The computer-readable medium of claim 13 wherein receiving, by the second native application, the particular enterprise data from the second, server-based enterprise application comprises receiving, by the second native application, the particular enterprise data from the second, server-based enterprise application without directly receiving the particular enterprise data by the second native application from the first native application.

15. The computer-readable medium of claim 13 wherein the first native application is an application other than a web browser.

16. The computer-readable medium of claim 13 the operations comprising:
executing the first native application on the mobile device; and
executing the second native application on the mobile device, wherein the second native application is not executed concurrently with the first native application.

17. The computer-readable medium of claim 13 the operations comprising:

receiving, by the first native application, input indicating an update for the particular enterprise data; and providing, by the first native application, the update for the particular enterprise data to the first, server-based enterprise application, wherein receiving, by the second native application, the particular enterprise data from the second, server-based enterprise application comprises receiving the updated particular enterprise data.

18. The computer-readable medium of claim 13 the operations comprising:

providing, in response to invoking the first native application on the mobile device, data to a server indicating that the server should execute the first, server-based enterprise application.

* * * * *